United States Patent [19]

Kuroda

[11] 4,274,672
[45] Jun. 23, 1981

[54] SUNSHADE SYSTEM IN SLIDING ROOF SYSTEM OF VEHICLE

[75] Inventor: Hiroshi Kuroda, Kamifukuoka, Japan

[73] Assignee: Honda Giken Kogyo Kabushiki Kaisha, Tokyo, Japan

[21] Appl. No.: 84,173

[22] Filed: Oct. 12, 1979

[30] Foreign Application Priority Data

Oct. 16, 1978 [JP] Japan .................. 53-141828[U]

[51] Int. Cl.³ .................................. B62D 25/06
[52] U.S. Cl. .................................. 296/216; 49/163; 160/102; 296/220
[58] Field of Search .............. 296/210, 216, 217, 220; 49/163, 168; 160/89, 90, 91, 102

[56] References Cited

U.S. PATENT DOCUMENTS

| | | | |
|---|---|---|---|
| 1,826,871 | 10/1931 | Ford | 296/220 |
| 3,033,608 | 5/1962 | Golde | 296/137 |
| 3,066,976 | 12/1962 | Rehmann | 296/137 |

*Primary Examiner*—John P. Silverstrim
*Assistant Examiner*—John A. Carroll
*Attorney, Agent, or Firm*—Haseltine and Lake

[57] ABSTRACT

A sliding roof construction for a vehicle comprising a transparent slide roof member movable forwardly and rearwardly to close and open an opening provided in the roof of the vehicle and a sunshade slidably mounted beneath the transparent slide roof member for selectively covering the slide roof member. A guide rail is mounted on the roof of the vehicle for slidably supporting the slide roof member and the guide rail has first and second guide grooves extending substantially parallel to one another. One of the guide grooves slidably supports slider members respectively mounted on the slide roof member and sunshade in front to back relation such that when the slide roof member is opened, the sunshade is opened therewith, whereas when the slide roof member is closed, the sunshade can selectively cover and uncover the closed slide roof member. The other guide groove slidably supports a stay on the slide roof member which can be used to drive the slide roof member in its opening and closing movements.

7 Claims, 4 Drawing Figures

SUNSHADE SYSTEM IN SLIDING ROOF SYSTEM OF VEHICLE

FIELD OF THE INVENTION

This invention relates to a sunshade system in a sliding roof system.

More particularly, the invention relates to a sunshade system in which the front stay of a slide roof member is supported in common by a guide rail for the sunshade, the front stay being disposed ahead of the sunshade such that, when the roof member is opened the sunshade is opened in interlocking relation therewith, and when the roof member is closed, the sunshade is free to be opened or closed.

PRIOR ART

Known in the art is a sliding roof system in which a slide roof member made of glass, synthetic resin, or the like is movable forwardly and rearwardly to open and close an opening provided in the roof of a vehicle.

In the known sliding roof system, a sunshade is provided under the slide roof member, and if the roof member is made of glass, the sunshade can be pulled out as protection against the sun when the opening is closed or it can be stored when not required. When the slide roof member is moved to open the roof, the sunshade is not needed and it must be stored. However, since the sunshade is a separate element from the slide roof member, it is necessary for the sunshade to be operated separatedly from the opening operation of the roof member, and when the slide roof member is opened, the sunshade must be capable of being opened separately from the opening operation of the slide roof member. Moreover, the sunshade must be capable of being opened separately and independently of the slide roof member even when the latter is power driven. Thus, the operation is duplicated.

SUMMARY OF THE INVENTION

An object of the invention is to provide a sunshade system associated with a sliding roof system which overcomes the above deficiency.

The invention provides a sunshade system of a sliding roof system in which a left-hand and a right-hand front stay of a slide roof member are engaged in respective guide grooves of guide rails supporting a left-hand and a right-hand end of a sunshade respectively such that the left-hand and the right-hand front stay are ahead of the sunshade, whereby when the roof member is retracted to open the roof opening, the sunshade is moved rearwardly to open in interlocking relation therewith, thereby making an operation to open the sunshade unnecessary when the roof member is opened. This simplifies the operation, and when the roof member is closed, the sunshade is free to be opened and closed. This results in a simple construction and a minimum number of parts.

DETAILED DESCRIPTION

Figure 1:
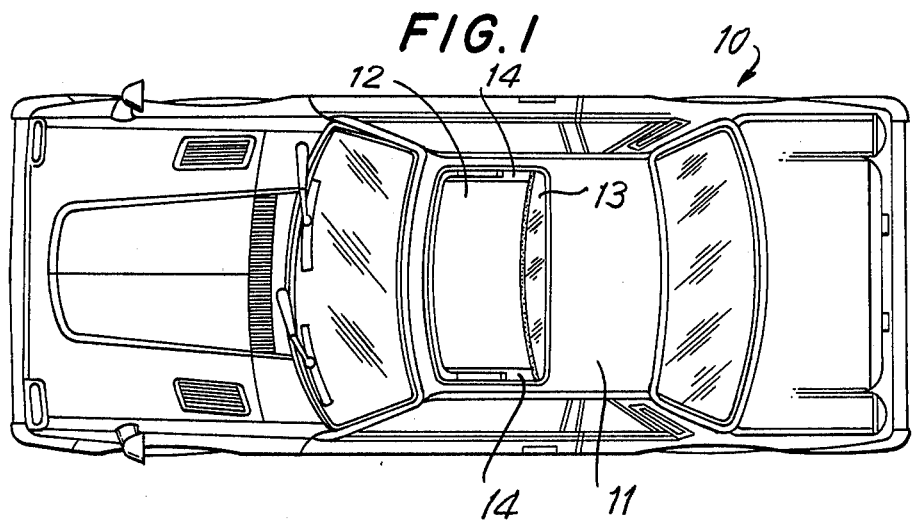
FIG. 1 is a plan view of a vehicle showing a sliding roof construction.

FIG. 1 shows a vehicle 10 having a roof 11 provided with an opening 12 in the front part of the roof. A slide roof member 13 made of glass, for instance, is movable between an opened and closed position for the opening 12. The slide roof member 13 is guided in its forward and rearward movement by guide rails 14 provided at the left and right margins on the underside of the roof.

Figure 3:
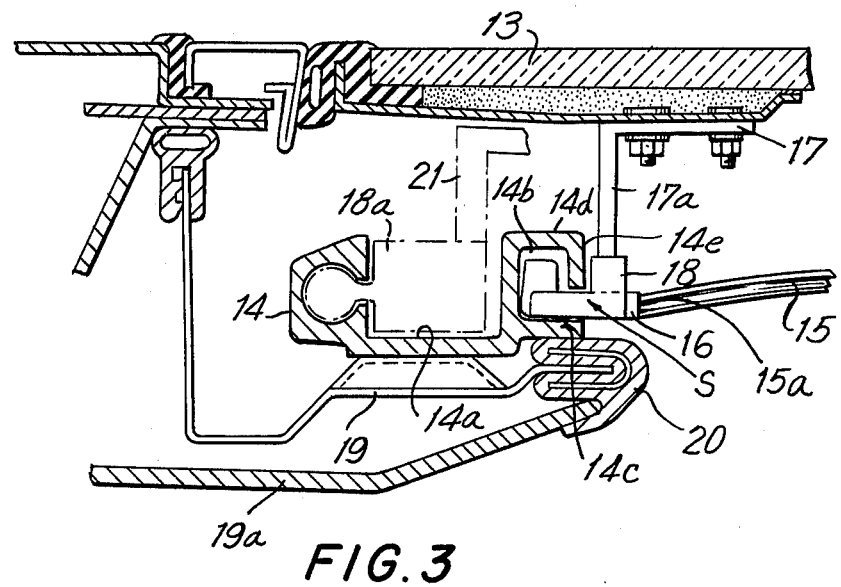
FIG. 3 is a transverse sectional view of the guide rail and sliding roof construction.

As seen in FIG. 3, the guide rail 14 is provided on the outside with a main groove 14a which is open upwardly and which slidably receives the slider 18a of a main stay 21 mounted at the rear of the roof member 13 at both lateral edges thereof. The slider undergoes movement in opposite directions by the action of a cable which moves the slide roof member 13 forwardly or rearwardly to close or open the opening 12 in the roof 11.

A guide groove 14b for a sunshade is provided on the inside of the guide rail 14. The guide groove 14b opens inwardly and has a section of C shape with sides of equal length and with the inside lower part open in the longitudinal direction. Therefore, the groove 14b is formed by a flat lower piece 14c and an upper piece 14d of reverse L shape with the inside end bent to depend downwardly at 14e. A clearance S is formed between the depending portion 14e and the end of the lower piece 14c.

The lateral end 15a of sunshade 15 is fitted with sliders 16 which extend through the clearance S and are slidably engaged in the guide groove 14b. The sliders 16 are provided, as shown in FIG. 4, at the front and rear of the right and left lateral sides of the sunshade 15, and the guide rails 14 are mounted, as described before, at the left and right sides with the grooves 14b facing one another.

Figure 2:
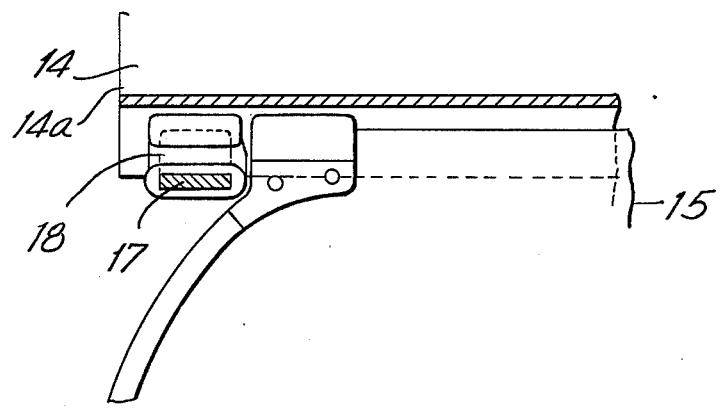
FIG. 2 is an enlarged cross-sectional view from above of the region in the front part of a guide rail of the sliding roof construction.

A front sub-stay 17 is mounted at each side at the front of the slide roof member 13, and an outside portion 17a of stay 17 depends downwardly and is bent outwardly and upwardly at the bottom to form an engaging portion of substantially U-shaped channel shape at the lower end of portion 17a. This U-shaped portion is covered by a slider member 18 whose coefficient of friction is small. The web of the covered U-shaped portion engages in the clearance S and the outermost upstanding leg extends in spaced relation in groove 14b so as to be freely slidable therein. The slider member 18, that is the engaging portion of the stay 17, is located in the groove 14b ahead of the slider 16 on the front side of the sunshade 15, so that the slider 18 is located immediately before the slider 16. The locational relationship is shown in FIGS. 2 and 4. Numeral 19 in FIG. 3 designates a roof frame beneath which a roof lining 19a is mounted. The inner periphery of an opening in the roof frame 19 and the roof lining 19a is covered with a trim 20 consisting of rubber or the like.

Figure 4:
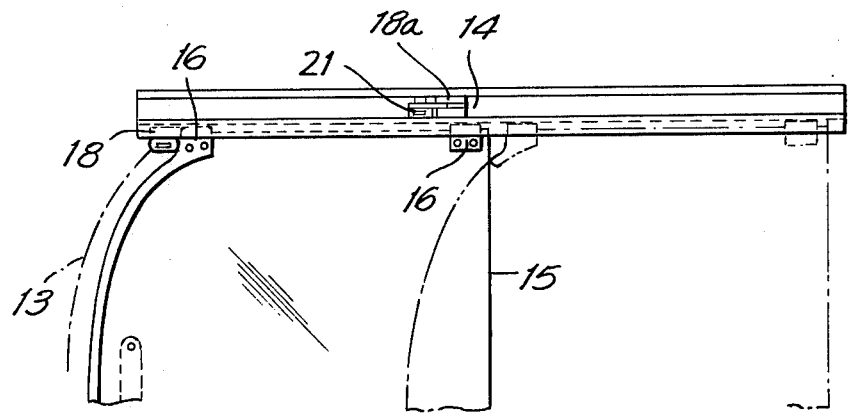
FIG. 4 diagrammatically illustrates, in plan view, the relation between the slide roof member and the sunshade of the sliding roof construction.

In the foregoing, as shown in FIGS. 2 and 4, in the forward closing position of the roof member 13, the front stay slider 18 is positioned ahead of the front slider 16 of the sunshade 15. Therefore, the sunshade 15 can be moved rearwardly to expose the transparent roof member 13 when the latter is closed. The sunshade can then be moved forwardly and rearwardly for covering and uncovering the roof member due to the placement of the slider 18a of the stay at the rear of the slide roof member 13 ahead of the slider 16 on the rear side of the sunshade 15 and by placing slider 18a in groove 14a. When the sunshade 15 has been closed, as shown, and the slide roof member 13 is closed, when the roof member 13 is moved rearwardly to open the roof opening manually or by the power drive of a motor because the front slider 16 of the sunshade is located immediately behind the front stay slider 18 and both sliders engage in the same groove 14b, the slider 16 is slidably moved rearwardly together with the slider 18. Hence, the sunshade 15 moves rearwardly together with the roof member 13. Thus, when the slide roof member 13 is opened, the sunshade 15 is opened in interlocking relation therewith. The double chain-dotted lines in FIG. 4 show the fully opened position of the sunshade. In the opened condition of the slide roof member 13, the sunshade 15 cannot be moved ahead of the slider 18 since there is no need for closing the sunshade.

Thus, when the roof member 13 and the sunshade 15 are fully closed, upon opening the roof member 13, the sunshade 15 interlocked therewith, is also opened. Because the guide groove 14b serves to guide both the slider 18 of the roof member 13 and the slider 16 of the sun shade 15, the component parts are less in number and the interlocking mechanism of the roof member and sunshade is very simple as described above. Because the relation between the groove 14b of the rail 14 and the stay 17 of the roof member 13 is as described above, engagement between the two is positive, preventing the stay 17 from coming out of the groove 14b due to deformation of either part as a result of collision, rollover, etc.

As is clearly seen from the foregoing, in accordance with this invention, the sunshade is made to open in interlocking relationship with the roof member with opening movement of the roof member, whereby a duplicate operation of opening the roof member and opening the sunshade is not required. The operability is improved, and with the roof member closed, the sunshade is free to be opened or closed. The foregoing is accomplished merely by placing the respective sliders one behind the other in the same groove, enabling one to move in interlocking relation with the other in a simple construction, and the respective sliders are supported in the same groove for minimization of parts while opening of the roof member forcibly opens the sunshade for reliable operation. Thus, great practicality is provided.

What is claimed is:

1. A sliding roof construction for a vehicle comprising a slide roof member formed of a transparent material and which is movable forwardly and rearwardly to close and open an opening provided in the roof of the vehicle, a sunshade slidably mounted beneath said transparent slide roof member for selectively covering said opening, said sunshade being made of an opaque material, guide rail means on said roof at the lateral edges of said opening for slidably supporting said slide roof member at its opposite lateral sides, said guide rail means each having first and second guide grooves spaced laterally of each other, said slide roof member including front stays slidably supported in laterally inner ones of said guide grooves and rear stays slidably supported in laterally outer ones of said guide grooves, and slider means on said sunshade slidably engaged in said laterally inner guide grooves and which are engaged by said front stays of said slide roof member, said slider means being positioned rearwards of said front stays and displaced thereby as the slide roof member is opened, so that the sunshade is concurrently opened.

2. A sliding roof construction as claimed in claim 1 wherein each laterally inner guide groove has a lateral opening extending inwardly into said groove, said front stays and slider means extending through said respective lateral openings.

3. A sliding roof construction as claimed in claim 2 wherein said front stays are of U-shape and include a leg slidably engaged in said groove.

4. A sliding roof construction as claimed in claim 3 wherein said slider means comprises a flat member extending through said opening and disposed immediately behind said front stay.

5. A sliding roof construction as claimed in claim 1 wherein said laterally outer grooves open upwardly.

6. A sliding roof construction as claimed in claim 5 wherein each said laterally inner groove has a closed top.

7. A sliding roof construction as claimed in claim 2 wherein said sunshade includes a second slider means mounted at the rear of said sunshade and slidably disposed in said laterally inner guide grooves.

* * * * *